Aug. 22, 1961 A. BIER 2,997,135
ANTI-SKID BRAKE CONTROL
Filed July 25, 1960 2 Sheets-Sheet 1

ALEXANDER BIER
INVENTOR
HUEBNER & WORREL
ATTORNEYS
BY Richard M. Worrel

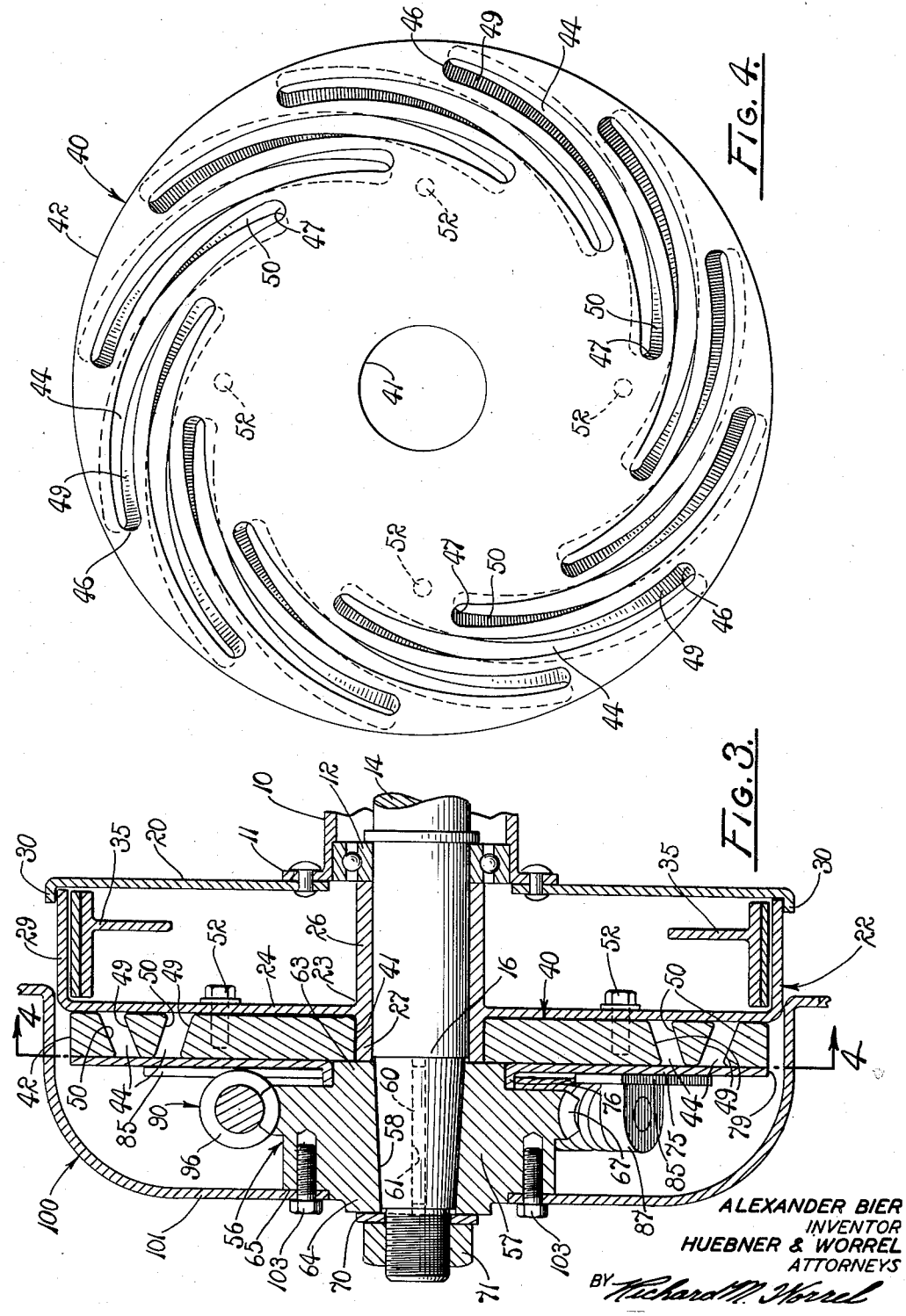

2,997,135
ANTI-SKID BRAKE CONTROL
Alexander Bier, 433 Roosevelt St., Fresno, Calif.
Filed July 25, 1960, Ser. No. 45,004
5 Claims. (Cl. 188—2)

The present invention relates to a brake mechanism and more particularly to an anti-skid brake control for reducing the speed of an automotive vehicle while minimizing the possibility of the tires skidding when the brakes are locked.

Conventional vehicle brakes have long included a brake drum rigidly secured to the wheel and brake shoes connected to the frame for movement between braking and releasing positions into and out of engagement with the drum. As is well known, braking is effected as a result of friction created by rubbing of the brake shoes against the brake drum. When the friction between the braking surfaces of the shoes and drum is greater than the friction between the tire and the vehicle supporting surface, the wheel is locked against rotation and skids, rather than rolls, over the road, or other supporting surface. Skidding is, of course, undesirable since it reduces braking effect, causes rapid wear of tires, and more significantly because it frequently results in loss of control.

Accordingly it is an object of the present invention to provide a brake mechanism for reducing the speed of a vehicle while minimizing the possibility of the tires skidding when the brakes are locked.

Another object is to prevent loss of control of a vehicle and to reduce tire wear incident to skidding of the tires thereof against a roadway over which the vehicle is traveling.

Another object is to allow the wheels of an automative vehicle to roll on the road even through the brakes are locked.

Another object is to provide a braking mechanism including a brake drum and brake shoes, for a vehicle, and which applies a predetermined resistance to rotation of a vehicle support wheel when the brake shoes are locked against the brake drum.

Another object is to connect a releasably engageable, geared mechanism to the wheel of a vehicle which, when the mechanism is engaged, allows rotation of the wheel but which requires application of greater torque thereto than when the mechanism is disengaged.

Other objects are to provide a brake mechanism of the type described which is adaptable for use in automobiles, airplanes, trucks, and the like, as well as in other environments where braking is required.

These, together with other objects, will become more fully apparent upon reference to the following description and the accompanying drawings.

In the drawings:

FIG. 3 is a somewhat enlarged, fragmentary cross-section taken on a plane at a position represented by line 3—3 in FIG. 2.

FIG. 4 is a face view of a gear plate employed in the subject mechanism and as viewed from a position represented by line 4—4 in FIG. 3.

Figure 1:
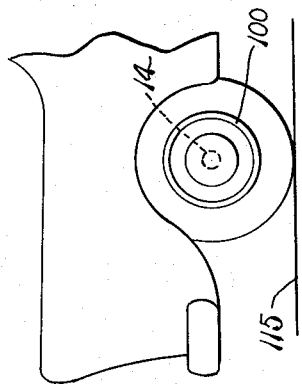
FIG. 1 is a fragmentary, side elevation of a rear portion of a vehicle incorporating a brake mechanism embodying the principles of the present invention.

Referring more particularly to the accompanying drawings, a vehicle is fragmentarily illustrated in FIG. 1 and includes an axle housing 10 which is stationary relative to the vehicle, and which provides a radially outwardly extended flange 11, as best shown in FIG. 3. A bearing 12 is positioned within the axle housing, and an elongated axle 14 is concentrically extended through the housing. The axle is rotatably journaled in the bearing and provides an outer end portion 16 outwardly extended from the axle housing, the latter having a cylindrical segment and a frusto-conical segment.

A brake shield 20 is secured to the flange 11 and is radially outwardly extended therefrom in circumscribing relation to the axle 14. A brake drum 22 provides a tubular hub 23 rotatably journaled on the outer end portion 16 of the axle 14; a radial wall 24 radially outwardly extended from the hub and dividing the hub into an inner main portion 26 and an outer extended portion 27; and an annular wall 29 integrally inwardly extended from the radial wall in concentric, circumferentially, spaced relation to the main portion of the hub. It is also to be noted that the brake shield has an annular rim 30 marginally circumscribing the annular wall of the brake drum.

Brake shoes 35 are mounted on the brake shield 20, in a manner not shown but well known in the art, for movement between braking positions engaging the annular wall 29 of the brake drum 22 and releasing positions radially inwardly spaced from the brake drum. From the description this far, it is evident that with the brake shoes released, the brake drum is free to rotate on the axle 14. However, when the brake shoes are engaged in a braking position, the brake drum is either completely locked for unitary rotation with the axle or is permitted to rotate relative to the axle against the frictional resistance of the brake shoes against the brake drum.

With particular reference to FIGS. 3 and 4, a circular gear plate 40 having opposite surfaces provides an axial opening 41 receiving the extended portion 27 of the hub 23 of the brake drum 22, a peripheral edge 42, and a plurality of elongated, arcuate, helical grooves 44 of uniform size eccentric to and positioned in uniformly, circumferentially spaced relation about said axle 14. The grooves have opposite ends 46 and 47 and opposed, longitudinally helically extended inner and outer side edges 49 and 50, respectively. Opposed edges of each groove face generally toward opposite surfaces of the plate at opposite ends of their respective groove. Further, adjacent slots are endwardly overlapped with adjacent inner and outer side edges of the overlapped ends of adjacent slots facing generally toward the same surface of the plate. Screws 52 are extended through the radial wall 24 of the brake drum 22 and screw-threadably engaged in the gear plate whereby the latter is rigidly secured to the brake drum for unitary movement therewith.

A circular worm wheel 56 includes a hub 57 having a tapered bore 58 fitted over the frusto-conical segment of the outer end portion 16 of the axle 14. The hub and the outer end portion of the axle are provided with a cooperating key 60 and keyway 61 whereby the hub of the worm wheel is connected to the axle for rotation therewith. The hub includes an inner, diametrically reduced boss 63 in abutment with the gear plate 40 and the extended portion 27 of the hub 23. The hub 57 of the worm wheel also has an outer end portion 64 extended oppositely from the boss, and an outer radial shoulder 65. It is to be noted that the worm wheel provides a plurality of radially extended, circumferentially spaced gear teeth 67, best seen in FIG. 3.

A washer 70 is fitted over the outer end portion 16 of the axle 14 and against the outer end portion 64 of the worm wheel 56. A nut 71 is screw-threaded on the outer end portion of the axle and tightened against the washer thereby to hold the brake drum 22, the gear plate 40, and the worm wheel 56 in assembled relation on the axle.

Figure 2:
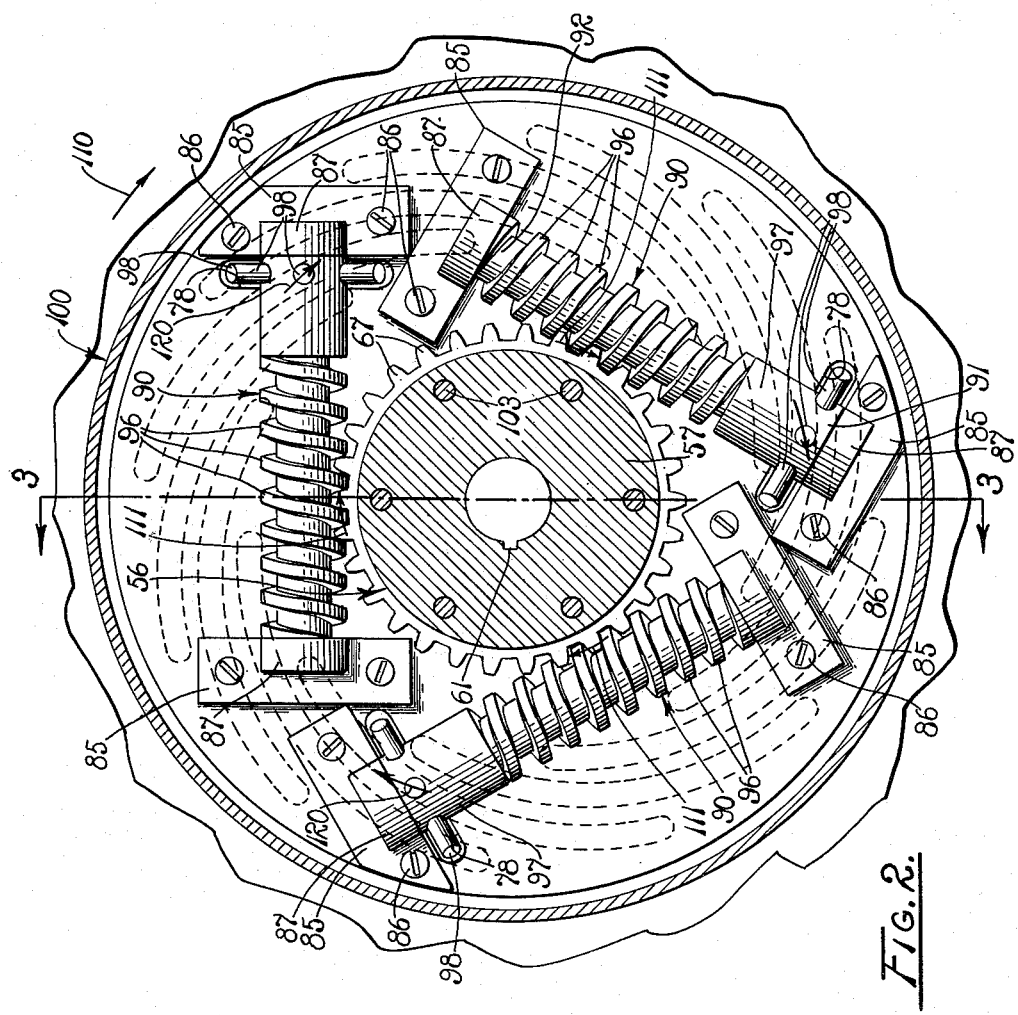
FIG. 2 is a somewhat enlarged, fragmentary, side elevation of the subject brake mechanism as viewed when the wheel of the vehicle shown in FIG. 1 is removed from its axle and with hidden portions of the mechanism illustrated in dashed lines.

A carrier disc 75 includes an annular hub flange 76 rotatably fitted in circumscribing relation on the inner boss 63 of the worm wheel 56. The disc is in slidable engagement with the outwardly disposed surface of the gear plate 40 and provides a plurality of elongated circumferentially spaced slots 78 obliquely related to the radius of the axle 14 and to the grooves 44 in the gear plate, all as best illustrated in FIG. 2. In the disclosed embodiment, there are three slots, and these slots are individually extended along imaginary lines intersecting in triangular relation to each other, as represented in FIG. 2. The disc also has an outer peripheral edge 79 substantially circumferentially congruent with the peripheral edge 42 of the gear plate. Thus, the carrier disc is rotatable concentrically of the axle and relative to the worm wheel and the gear plate. With particular reference to FIG. 2, pairs of opposed, spaced brackets 85 are connected to the carrier disc 75 by means of screws 86. One bracket of each pair of brackets is positioned adjacent to and on one side of a slot 78 while the other bracket of each pair is positioned on the opposite side of and relatively remotely from the slot adjacent to its corresponding bracket. Bearings 87 are mounted in coaxial alignment in each pair of brackets. Elongated worm gears 90 provide opposite driven and drive ends 91 and 92, respectively, individually rotatably mounted in the bearings 87 on the pairs of brackets. The worm gears provide longitudinal axes individually perpendicularly related to the slots 78 or, stated otherwise, right-angularly related to the radius of the axle 14.

The worm gears 90 provide helical threads 96 in mesh with the gear teeth 67 on the worm wheel 56. Each worm gear also has an elongated shank 97 relatively adjacent to the driven end 91 of the worm gear and thus adjacent to its respective slot 78 in the carrier disc 75 overlayed by the worm wheel. A plurality of gear pins 98 are rigidly radially outwardly extended in uniformly, circumferentially, spaced relation from the shank. The pins extend successively inwardly through the respectively adjacent slots into the grooves 44 in the gear plate incident to rotation of the worm gears in the respective bearings 87 and further upon rotation of the carrier disc 75 relative to the gear plate 40. The pins enter the grooves substantially midway between the opposite ends 46 and 47 thereof and thereafter engage the outwardly disposed outer edges 50 whereby they are subsequently urged out of the grooves by camming engagement with the said outer edges.

The vehicle 9, illustrated in FIG. 1, provides a support wheel 100 mounted on the axle 14 and includes a cover 101. The cover is positioned against the radial shoulder 65 and is connected by bolts 103 to the outer end portion 64 of the worm gears 90, worm wheel 56, the carrier disc 75, and the gear plate 40.

*Operation*

The operation of the described embodiment of the subject invention is briefly summarized at this point.

During normal operation of the vehicle when the brake shoes 35 are in released position, the support wheel 100 rotates freely with the axle 14 and relative to the axle housing 10. More specifically, assuming the wheel is rotating in the direction indicated by arrow 110 in FIG. 2, incident to forward movement of the vehicle over the road 115, torque forces, indicated by arrows 111, are applied to the carrier disc 75 through the engaging teeth 67 and the threads 96 of the worm wheel 56 and the worm gears 90, respectively. It is to be noted that the worm wheel is not effective in directly rotating the worm gears so that these torque forces are transmitted to the carrier disc on which the worm gears are mounted through the brackets 85. Further, turning movement indicated by arrows 120, also in FIG. 2, is applied to the gear plate 40 by engagement of the pins 98 with the outer edges 50 of the grooves 44. Since the brake shoes 35 are released, the gear plate and brake drum 22 are freely rotatable on the axle 14 and relative to the axle housing. Therefore, the brake drum rotates with the support wheel 100 and no braking action is effected.

If it is desired to brake the speed of the vehicle, the brake shoes 35 are expanded into braking positions wherein they engage the brake drum 22. Assuming that the brake drum is thereby locked against rotation relative to the brake shoes and the brake shield 20, continued rotation of the support wheel 100 applies torque forces 111 on the carrier disc 75, as before. However, with the brake drum locked, the gear plate 40 is also held stationary relative to the axle 14. Thus, the pins 98 encounter resistance incident to engagement thereof with the outwardly facing outer edges 50 of the helical grooves 44 so that the support wheel 100 no longer rotates freely.

Since the carrier disc 75 is rotated by the applied torque 111, the inwardly disposed pins 98 are forced against the outwardly disposed outer edges 50 of the grooves 44 whereby said outer edges cam the engaged pins outwardly of the grooves. This rotation of the carrier disc and camming action in the grooves causes the pins to move successively into and out of the grooves during rotation of the carrier disc. Rotation is thus imparted to the worm gears 90 whereby engagement of the threads 96 with the gear teeth 67 allows rotation of worm wheel 56, and therefore, the support wheel 100 is permitted to rotate but against a resistance created by the described gear train interconnecting the axle 14 and the brake drum 22. This braking effect on the support wheel reduces the speed of the vehicle while minimizing the possibility of skidding incident to the locking of the brakes.

From the foregoing it will be evident that a brake mechanism has been described which allows the wheels of a vehicle to roll on the road over which the vehicle is traveling even though the brakes are locked. The subject mechanism reduces the speed of the vehicle while minimizing the possibility of skidding and the adverse conditions resulting therefrom. While the brake mechanism has been described in association with a vehicle it has utilities in other environments where similar problems are involved.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a support and an axle rotatably mounted in the support; an apparatus for braking rotation of the axle comprising a brake drum freely rotatably borne by the axle, means mounted on the support releasably engageable with the brake drum for locking the same against rotation relative to the support, and a gear train mechanism interconnecting the drum and the axle for resisting rotation of the axle when rotation of the brake drum on the axle is precluded but allowing free rotation of the axle when the drum is freely rotatable on the axle.

2. The combination of claim 1 wherein said gear train mechanism includes a worm wheel concentrically secured to the axle, a worm gear in mesh with the wheel; a carrier rotatably borne by the worm wheel and rotatably mounting the worm gear, pins radiating outwardly from the worm gear and extendable through the carrier, and means connected to the drum and engageable with the pins for rotating the worm gear and thereby allowing rotation of the worm wheel incident to application of turning moment thereto.

3. In combination with a support and an axle rotatably mounted in the support; an apparatus for braking rotation of the axle comprising a brake drum freely rotatably borne by the axle; means mounted on the support releasably engageable with the brake drum for locking the same against rotation relative to the support, a worm wheel concentrically connected to the axle, a worm gear, means rotatably borne by the axle and mounting the worm gear in mesh with the wheel, and gear means coupling the worm gear to the brake drum for imparting rotation to the worm gear when rotation of the brake drum is precluded and turning moment is applied to the worm wheel whereby rotation of the worm wheel is permitted.

4. The combination of claim 2 wherein said gear means includes a gear plate having opposite surfaces, being secured to the brake drum concentrically of the axle, and having a plurality of arcuate grooves in circumferentially spaced relation therearound, said grooves being eccentric to the axle and having opposite ends and opposite, longitudinally helically extended side edges, adjacent grooves being endwardly overlapped with adjacent side edges of adjacent ends facing generally toward the same surface of the plate with opposite ends of each side edge facing toward opposite surfaces of the plate, and with adjacent ends of the side edges of each groove facing toward opposite surfaces of the plate; wherein said worm gear mounting means includes a carrier disc journaled on the worm wheel and having a slot transversely overlapping the grooves; and wherein said gear means further include circumferentially spaced pins radially outwardly extended from the worm gear in a common plane with the slot and successively extendible into the grooves for camming engagement by, and urgence out of the grooves, by the side edges thereof incident to rotation of the disc relative to the plate.

5. In a vehicle including a support, an axle rotatably mounted in the support, and a ground support wheel connected to the axle; an apparatus for braking rotation of the support wheel and thus braking movement of the vehicle comprising a brake drum freely rotatably borne by the axle; means mounted on the support releasably engageable with the brake drum for locking the same against rotation relative to the support; a gear plate secured to the drum concentrically of the axle having an inside surface against the drum, an opposite outside surface, and a plurality of elongated, arcutate, helical, grooves of uniform size eccentric to and positioned in uniformly circumferentially spaced relation about said axle, the grooves having opposite ends and opposed longitudinally helically extended side edges whereby opposed edges face generally toward opposite surfaces of the plate at opposite ends of their respective groove, adjacent grooves being endwardly overlapped with adjacent side edges of the overlapped ends of adjacent grooves facing toward the same surface of the plate; a worm wheel including a hub rigidly secured to the axle and a plurality of gear teeth extended circumferentially of the axle and endwardly spaced from the outside surface of the plate; a carrier disc rotatably journaled on the hub of the wheel between the teeth and the plate and having a slot therein in radially spaced relation to the axle; an elongated worm gear having opposite drive and driven ends, a longitudinal axis, and threads helically extended longitudinally around said drive end; means borne by the plate rotatably mounting the worm gear with its axis substantially normal to the axle, with said driven end thereof extended transversely of the slot, and with said threads in mesh with the teeth of the wheel; and a plurality of circumferentially spaced pins radially outwardly extended from the driven end of the worm gear and successively extendible through the slot in the disc individually into the grooves of the plate whereby with the brake drum locked against rotation and with torque applied to the worm wheel, torque is imposed on the disc through the meshing teeth and threads to rotate the disc on the hub, whereby rotation of the disc imparts rotation to the worm gear through engagement of said helical edges of the grooves in the gear plate successively with the pins, and whereby rotation of the worm gear allows rotation of the worm wheel in the same direction as said applied torque so as to allow rotation of the support wheel but against greater resistance than when said brake drum is released.

References Cited in the file of this patent

UNITED STATES PATENTS

| | | |
|---|---|---|
| 716,324 | Whalen | Dec. 16, 1902 |
| 1,640,919 | Ballot | Aug. 30, 1927 |
| 1,658,561 | Kennington | Feb. 7, 1928 |